July 4, 1950 — R. E. MOULE — 2,513,581
CAPSULATOR
Filed June 23, 1947 — 6 Sheets-Sheet 1

Inventor
Rex E. Moule
by Parker & Carter
Attorneys.

July 4, 1950 — R. E. MOULE — 2,513,581
CAPSULATOR
Filed June 23, 1947 — 6 Sheets-Sheet 2

Inventor
Rex E. Moule
by Parker & Carter
Attorneys.

July 4, 1950 R. E. MOULE 2,513,581
CAPSULATOR
Filed June 23, 1947 6 Sheets-Sheet 3

DIES CLOSED
DIES CLOSING
CONCENTRIC ARC
INJECTING
STRIPPER PLATES CLOSING

Inventor
Rex E. Moule
by Parker & Carter
Attorneys.

July 4, 1950     R. E. MOULE     2,513,581
CAPSULATOR
Filed June 23, 1947     6 Sheets-Sheet 4
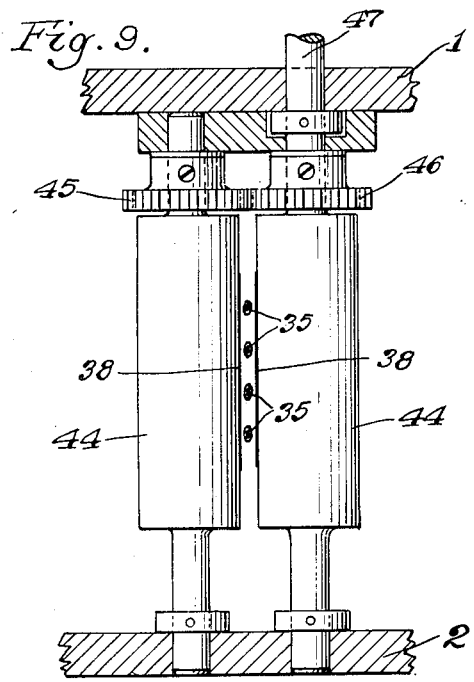
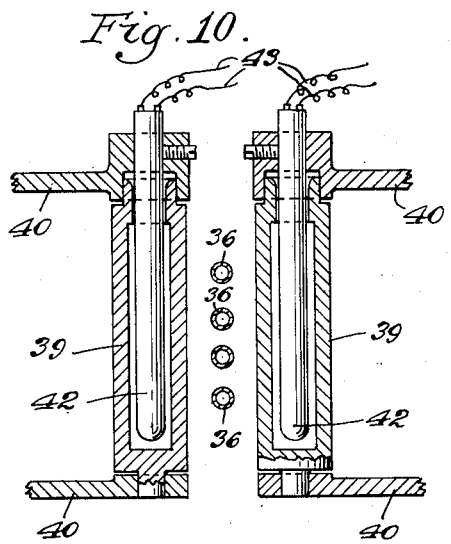
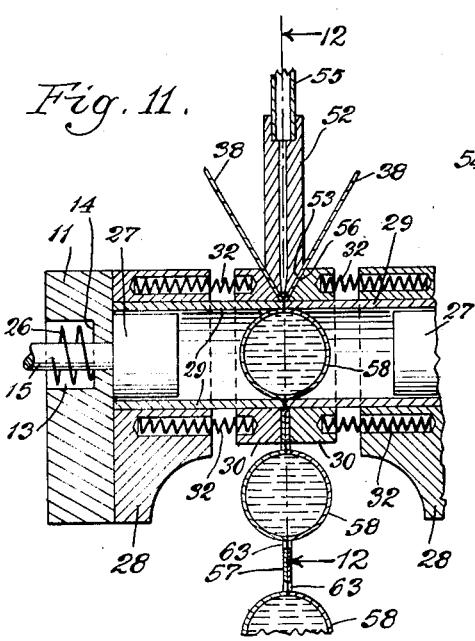
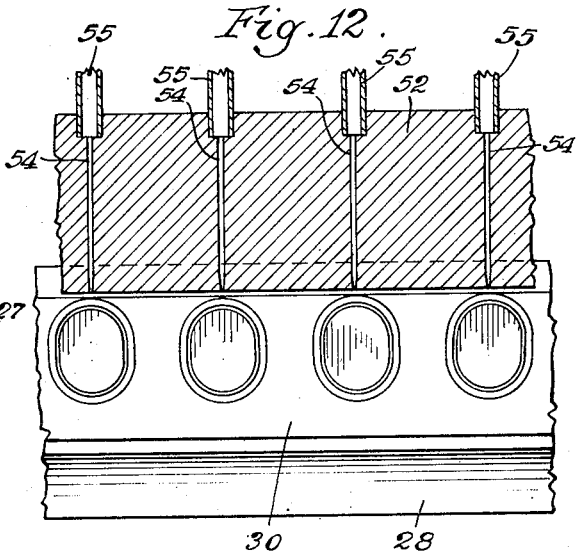
Inventor
Rex E. Moule
by Parker & Carter
Attorneys.

July 4, 1950 R. E. MOULE 2,513,581
CAPSULATOR
Filed June 23, 1947 6 Sheets-Sheet 5

Inventor
Rex E. Moule
by Parker & Carter
Attorneys.

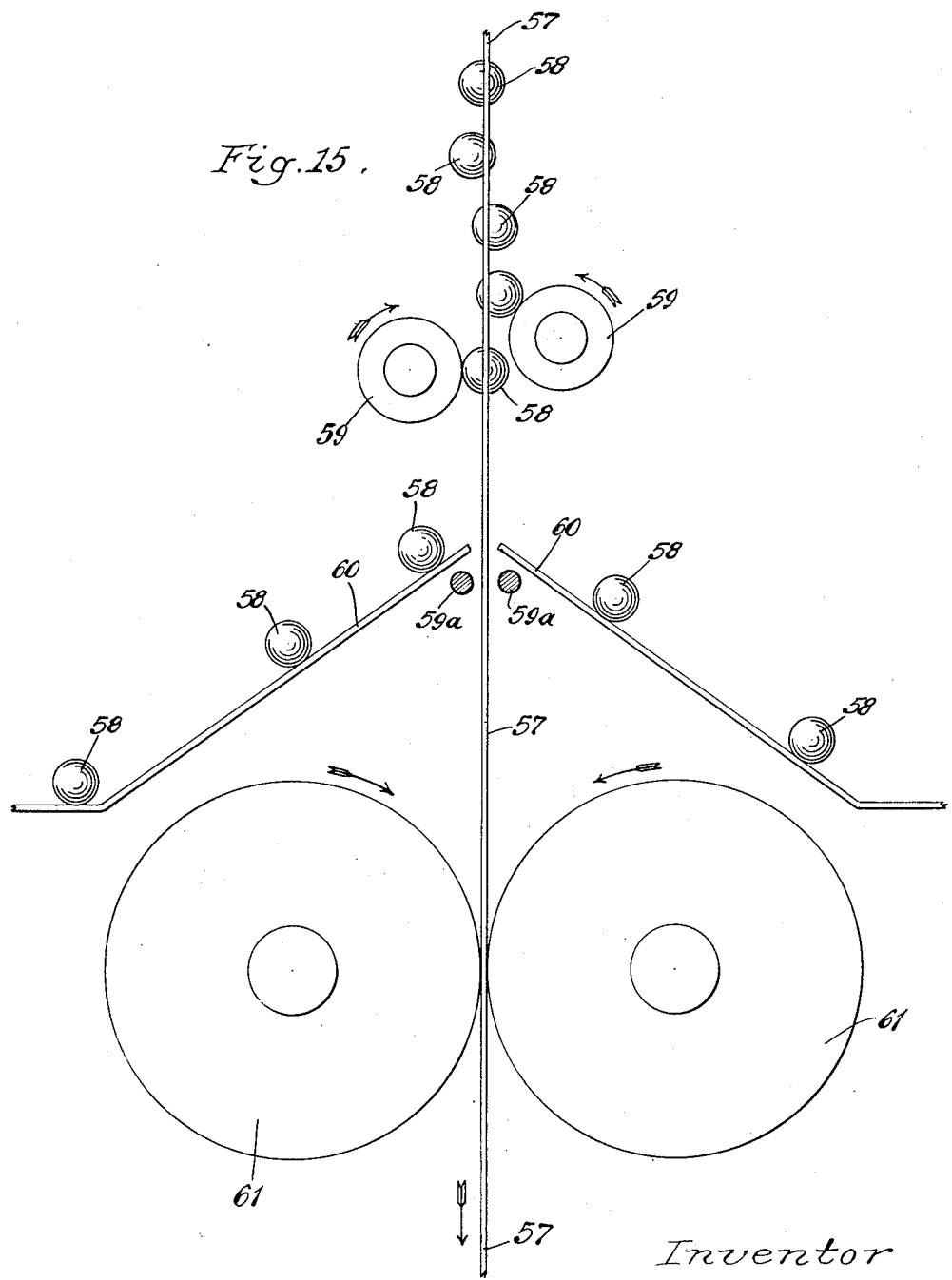

Patented July 4, 1950

2,513,581

UNITED STATES PATENT OFFICE 2,513,581

CAPSULATOR

Rex E. Moule, Worcester, Mass., assignor to Norton Company, Worcester, Mass., a corporation of Massachusetts Application June 23, 1947, Serial No. 756,569

4 Claims. (Cl. 18—19)

1

This invention relates to a machine for making capsules and for filling them as they are made. It has for one object to provide in connection with such a machine means for depositing in capsules, in a continuous process, a measured quantity of filling material. This material may be liquid, paste or any material which can be appropriately handled by the device shown.

Another object is to provide means for forming capsules of gelatinous material in a continuous process and for controlling the formation of the capsules to insure accuracy and uniformity in shape and to eliminate damage to capsules as formed.

Another object is to provide a machine of the type indicated in which high production is possible.

Another object is to provide a method of forming and filling and discharging capsules.

Other objects will appear from time to time throughout the specification and claims.

The invention is illustrated more or less diagrammatically in the accompanying drawings, wherein:

Figure 9 is a section taken at line 9—9 of Figure 1, with the rolls shown in elevation;

Figure 10 is a section taken at line 10—10 of Figure 1;

Figure 11 is a sectional detail generally illustrating a portion of the mechanism shown in Figure 3 in modified form;

Figure 12 is a section taken at line 12—12 of Figure 11;

Figure 15 is a diagram illustrating a means and method for removing capsules from the network in which they are formed.

Like parts are indicated by like symbols throughout the specification and drawings.

Figure 1:
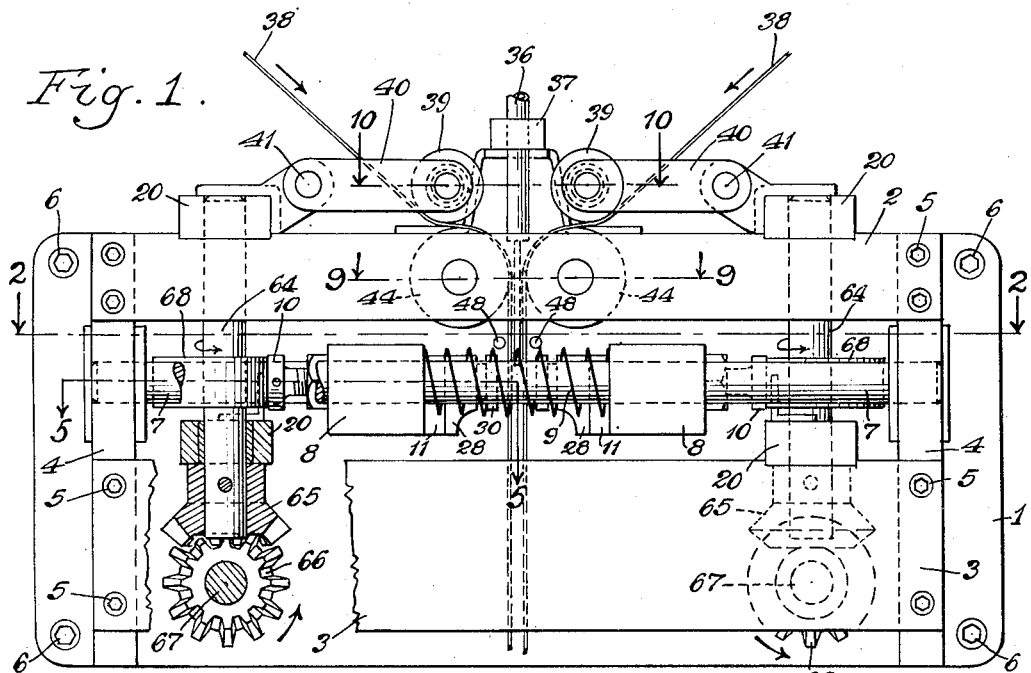
Figure 1 is a side elevation with parts broken away and parts in section, showing one form of the device.
Figure 2:
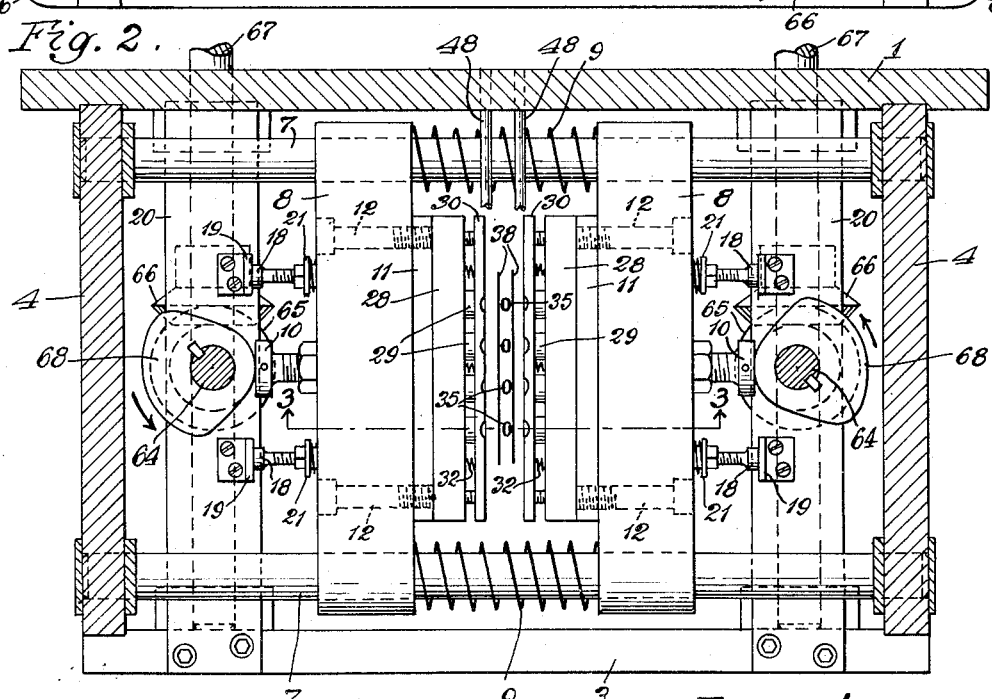
Figure 2 is a section taken at line 2—2 of Figure 1.

The capsule forming mechanism is conveniently mounted within any frame work or support. As shown this support includes a member 1, members 2 and 3 generally parallel to the member 1 and transverse frame and supporting members 4, 4. These parts are secured together by screws 5 or otherwise. The member 1 may be fastened to support such as a portion of the machine by screws 6 or otherwise.

The capsule forming mechanism within the frame work or support above described includes guiding and supporting shafts 7, 7 which are mounted in the transverse supports 4. Die carrying members or die blocks 8, 8 are mounted to slide on the members 7. Springs 9 may be mounted on the members 7 between the members 8 and the springs are biased to move the members 8 apart. Each of the die block members 8 is provided with a cam contacting member 10 which is adjustably mounted in it and is adapted to be contacted by a cam which will be described below.

Supported on each of the members 8 is a die carrying assembly which includes a plate 11 held to a member 8 by one or more screws 12. The plate is provided with socket portions 13 which terminate in shoulders 14. Plungers 15 are positioned one in each of the sockets 13 and these plungers penetrate through the plate 11 on both sides. At their rear ends they contact an actuating plate 16 which is provided with rods 17. The rods 17 at their rear ends extend beyond the plate 8 and are provided with abutment members 18 adapted to contact abutments 19 on a transverse member 20. The members 17 are provided with stops 21 against which springs 22 bear at one end. At their opposite ends the springs 22 bear upon shoulders 23 within sockets or depressions 24 formed in the member 8. The abutment members 18 are adjustably received in the members 17. A rod 25 passes through all of the plungers 15 and springs 26 bear at one end against the rod 25 and at the other end against the shoulders 14. The springs are biased to withdraw the plungers and to hold them in contact with the actuating plate 16.

At their outer ends the plungers 15 are provided with knock out enlargements 27.

Figure 3:
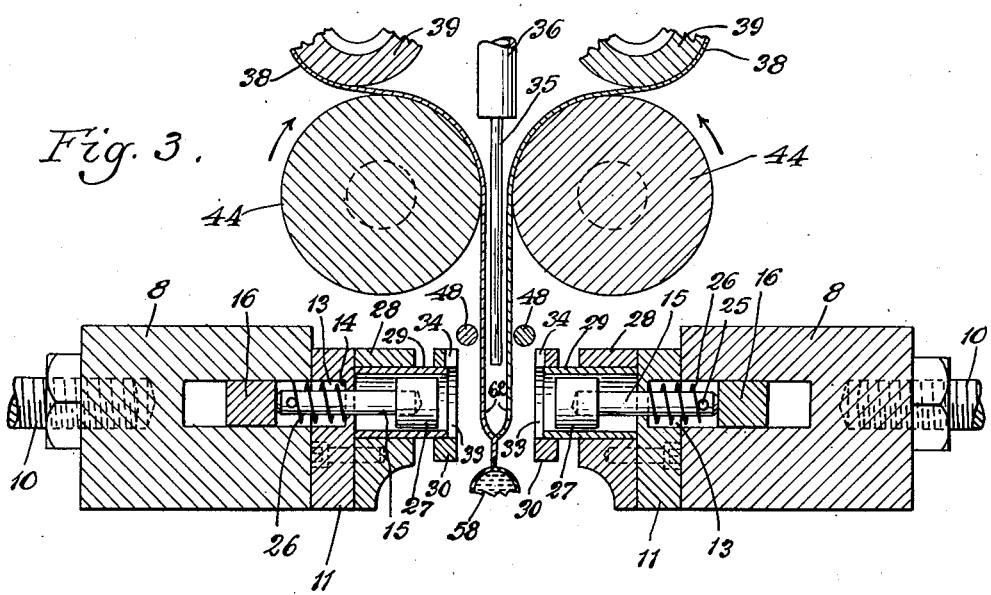
Figure 3 is a section taken on an enlarged scale at line 3—3 of Figure 2.
Figure 4:
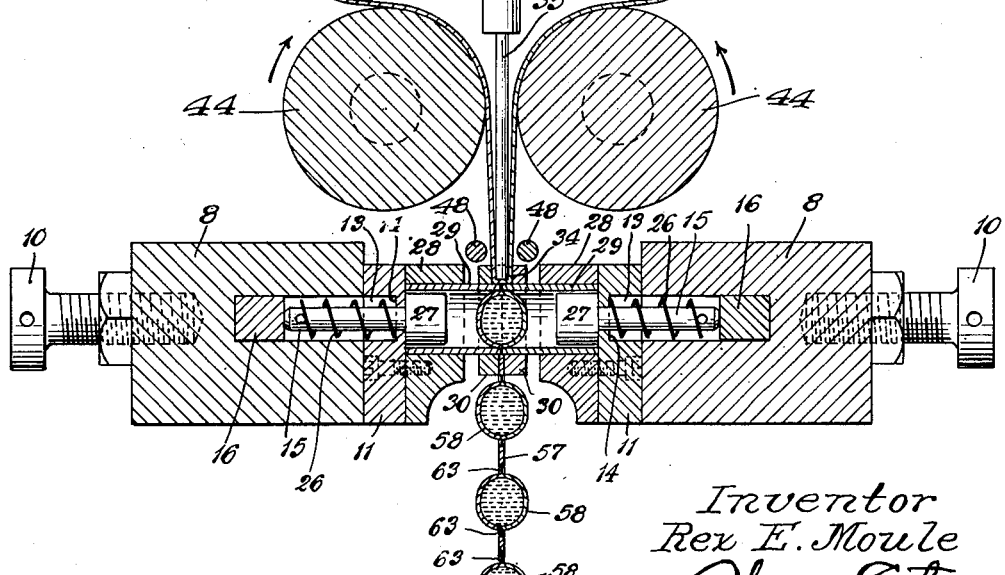
Figure 4 is a view similar to Figure 3 showing the parts in modified position.
Figure 5:
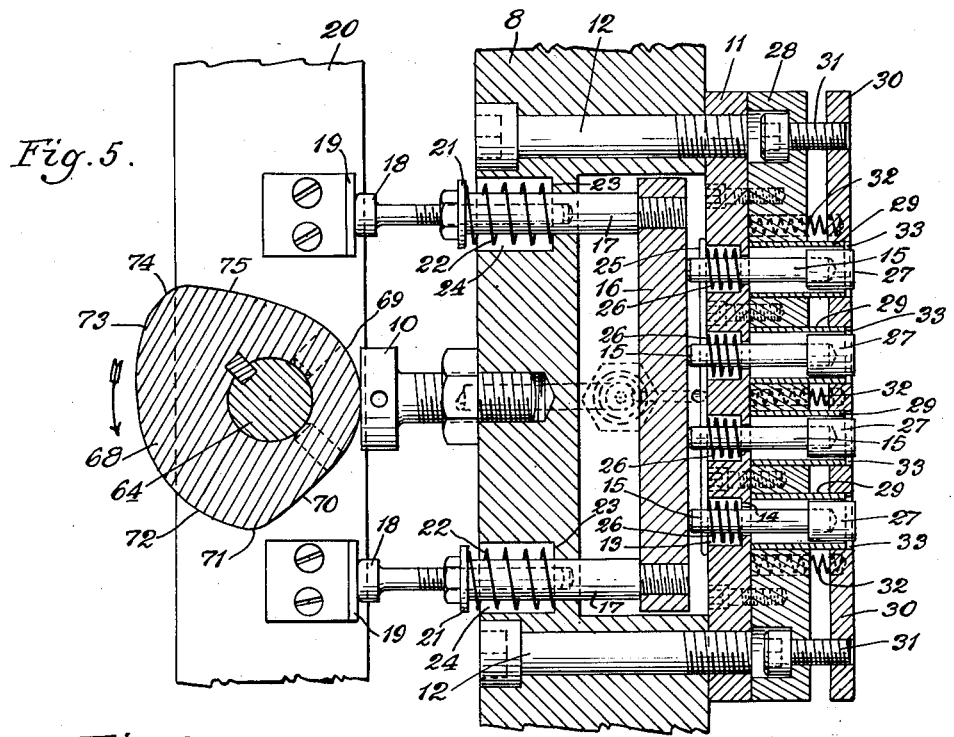
Figure 5 is a section taken on an enlarged scale at line 5—5 of Figure 1.

Fixed to the plate 11 is a plate 28 through which the plungers 15 pass. Die members 29 are fixed one about each plunger 15 and in the plate 28. Each die member 29 comprises a tubular die element projecting forward from its respective die block 8. The tubular die elements of the two dies are opposed to one another and axially aligned. An ejecting or presser plate 30 is mounted on the outer face of the plate 28 and is held in place by screws 31. Springs 32 bear upon the plate 30 and are mounted in the plate 28 and are biased to hold the plate 30 in the outward position as shown particularly in Figures 3 and 5. As shown particularly in Figure 5 the die members 29 have their ends inside the outer surface of the member 30 when that member is in the extended position. This condition is also shown in Figure 3. In the final forming position of the machine as shown in Figure 4, the die members extend outwardly beyond the plate 30, because the latter has been depressed against the resistance of the springs 32. The plate 30 is provided with perforations 33 within which the die members 29 may reciprocate with a relatively tight but movable fit. Each of the perforations or openings 33 has formed in communication with it an upwardly extending channel or depression 34. The purpose of this channel or depression is illustrated in Figure 4 in which the final capsule forming operation is taking place and in which the two opposite plates 30 have been brought into contact with the ribbon of material from which the capsules are being formed. As shown in Figure 4 and other later figures the member through which the capsule filling is supplied projects almost to the edge of the die members 29 and thus lies within the relatively tubular cavity formed by two oppositely positioned depressions 34.

The material with which the capsules are to be filled is supplied by a series of passage members or nozzles 35 which may be enlarged as at 36. Any suitable supporting or carrying means 37 may be used to support and position the members 35 and 36.

As above pointed out the material of which the shells of the capsules are formed may comprise gelatinous or comparable material. It is preferably fed to the die forming means in the form of a pair of ribbons or webs 38, 38. These ribbons are produced in any desired manner and the invention is not limited to any particular means or method for producing the ribbons. The ribbons are fed toward the point of capsule formation and may pass about one or more feeding and guiding rolls. In the form shown in Figures 1 to 4 inclusive, rollers 39, are mounted on arms 40 which are pivoted as at 41 on the member 2 or elsewhere on the housing and frame work mechanism. For some purposes it is necessary to maintain the ribbons in heated or relatively heated condition and where that is the case the rollers 39 are hollow and contain heating elements 42. These elements are shown generally in Figure 4 and in detail in Figure 10. They are connected with a source of heating current by electrical conduits 43. Any heating means may be used and the invention is not limited to electrical heating means.

After the ribbons 38 pass the rolls or rollers 39 they move to rollers 44 which are primarily feed rollers and are positively driven. They are mounted in the members 1 and 2 and they may carry gears 45 and 46 which mesh with each other. The gear 46 and its roll 44 may be carried on a shaft 47 which is positively driven with the result that the feed rolls 44 rotate as shown by the arrows in Figures 3 and 4 and positively feed the ribbon of capsule forming material toward the point of capsule formation.

Below the rolls 44 in the direction of ribbon travel is mounted a pair of rods 48. These rods are shown generally in the first four figures, and they serve to prevent substantial displacement of the ribbons 38 as they move toward the capsule forming zone. Ordinarily they are out of contact with the ribbons, and they are not, therefore, guide members in the usually accepted meaning of that word. They serve, however, to prevent excessive displacement of the ribbons.

Figure 7:
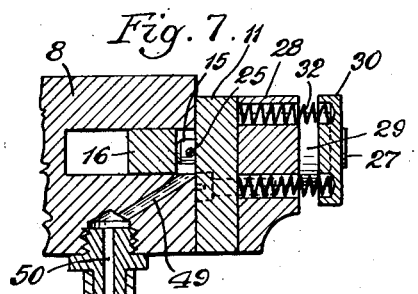
Figure 7 is a section taken at line 7—7 of Figure 6.

The member 8 may, in the form shown in Figure 7, be provided with a duct 49 communicating with the interior of the member 8. A connector 50 and conduit 51 communicate with the duct 49. Pressure or suction may be directed through the duct 49 and the members 50 and 51.

In Figures 11 and 12 a modified form of the means for filling capsules with material is shown. The structure shown in those figures is generally the same as that shown in preceding figures, except that instead of a plurality of members 35 for supplying material to the capsules, there is supplied a member 52. This member, shown particularly in Figure 11, is sharpened or of reduced thickness along its lower edge. The member 52 is provided with a plurality of passages 54 which extend through it, and each of these passages communicates with a material supplying member 55. The plate 30 is substantially the same as that shown above, except that the grooves or depressions 34 are omitted and instead of that, the upper edge of each plate 30 is inclined or beveled, as at 56, to correspond in shape to the beveled or inclined edge 53 of the member 52.

After the two ribbons 38 of capsule forming material have passed through the capsule forming mechanism and when the capsules are completed, the two ribbons have been compressed together to form a single composite ribbon 57 which is shown in part in Figures 3, 4, 11, 13, 14 and 15. The capsules 58 adhere to or are held in the ribbon 57 to some degree. Some of them may fall free. Others may be retained in place, and it is useful generally to provide means for removing the capsules from the ribbon. This includes a pair of rolls or rollers 59, 59 which as shown in Figure 15 are positioned out of contact with the ribbon 57 and are spaced apart approximately the diameter of a capsule. The rollers may be mounted for adjustment toward and from each other.

The members 59a, which may be rods similar to the rods 48, are positioned adjacent the ribbon 57. They are not in contact with the ribbon 57 are serve merely to prevent excessive displacement of the ribbons. The members 59, as shown by the arrows in Figure 15, rotate in the same direction as that in which the ribbon 57 moves. They will preferably rotate at a somewhat higher speed than the ribbon.

As the ribbon 57 moves downwardly away from the zone of capsule formation, the capsules are brought successively into contact with one or another of the rolls 59, which may be positioned one slightly above the other. Each capsule contacts at least one of these rolls and is rolled by it or otherwise moved by it out of engagement with the ribbon and hence falls free on one side of the ribbon or the other, to be caught upon one or the other of the conveying members 60.

The capsules 58 fall free upon these members and are moved away to a point of use or packing. Beneath the members 60 are conveying or driving rolls 61 which rotate in the direction indicated by the arrows in Figure 15. These rolls engage the ribbon 57 and move it steadily away from the zone of capsule formation. The rolls 61 are driven intermittently in the same manner as the feed rolls. They maintain the tension on the ribbon 57 and may be considered "tension rolls" for that reason. Their speed of rotation determines the stretching effect which is exerted on the ribbon 57 when the capsules are formed.

Figure 8:
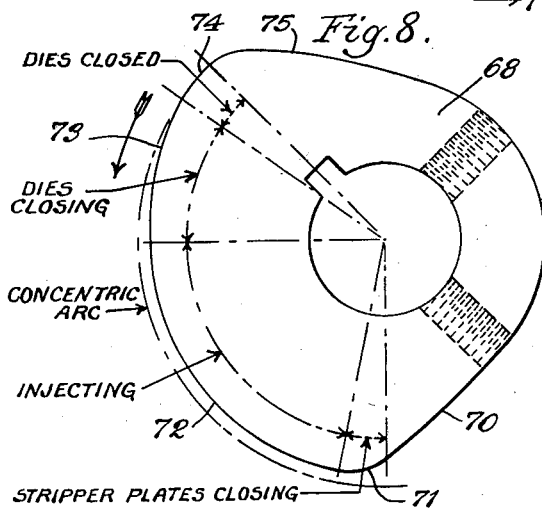
Figure 8 is a plan view of a suitable cam for operating the capsule forming mechanism.

While many different means for moving the die assemblies toward each other may be used, the one shown herewith is convenient and it comprises a pair of similar cams effective upon the members 10 to force the die assemblies together in opposition to the springs 9. Thus two shafts 64, 64 are mounted in the frame generally as here shown and they are carried in the transverse members 20. Each has provided at its bottom the bevel gear 65 which meshes with a bevel gear 66 on a shaft 67. These shafts are driven in the direction indicated by the arrows in Figures 1, 2 and 5. Each shaft 64 carries upon it a cam 68. The cams as shown generally in Figure 2 and in detail in Figure 8 are shaped to provide a plurality of zones, the effect of which is indicated in the legend appearing on Figure 8. As the cam for example moves in the direction of the arrows of Figure 5 there is a portion 69 concentric with the axis of rotation of the cam. During the time that this portion 69 is rotating past the contact member 10 no movement of the die assembly occurs. Following the portion 69 is a portion 70 which terminates in a curved portion 71. As the portion 70 is moving past the member 10 and in contact with it the die assembly is moved forward. The stripper plates, that is to say the plates 30, engage the ribbons 38 and press them together. Following the portion 71 is an arc or portion 72 of the cam which is concentric with its axis of rotation. During the time that this portion of the cam is moving past and in contact with the member 10 no further movement of the die assembly occurs and the die assembly is substantially stationary in the position and condition shown in Figure 13. Injection of the capsule filling material takes place through the member 35 or the passage 54 during this period of movement of the cam.

Following the concentric arc 72 of the cam 68 is a rising portion 73. While this portion of the cam is moving past the member 10, injection of material into the capsule has stopped, and the die assembly moves forward to the position of Figure 14, depressing the stripper plates or members 30 and causing the die inserts 29 to move outwardly toward each other so that their edges are exposed beyond the face of the members 30. They thus compress the ribbons 38 together and form the composite ribbons 57 and the depressed or compressed areas 63 around each completed capsule 58.

The dies remain in this position for a relatively short period, determined by the cam portion 74, which is concentric with its axis of rotation. As the cam moves further, the portion 74 passes out of contact with the member 10, and the cam portion 75 moves into contact with the member 10, permitting the die assemblies to be withdrawn from contact with each other by the springs 9, which force them apart. Obviously other means might be provided for moving the die assemblies, but those described are suitable and effective.

The material used in making the capsules may be gelatin or any material which can be treated substantially as gelatin is treated—namely, can be formed into ribbons and joined together with filling material to form capsules. Obviously many materials which are not properly considered as gelatin or as gelatinous have mechanical and chemical properties which permit their use in forming capsules by means of the mechanism shown and in accordance with the steps illustrated.

Although I have shown an operative form of my invention, it will be recognized that many changes in the form, shape and arrangement of parts can be made without departing from the spirit of the invention, and my showing is, therefore, to be taken as, in a sense, diagrammatic.

The use and operation of this invention are as follows:

The capsule forming material which may be gelatinous is fed past the rollers 39 and 44 to the zone of capsule formation. Periodically, at the time of the formation of each capsule or each set of capsules, a measured charge of liquid or other capsule filling material is deposited in the bottom of the bag or bags formed by the joining of the ribbons 38.

Figure 13:
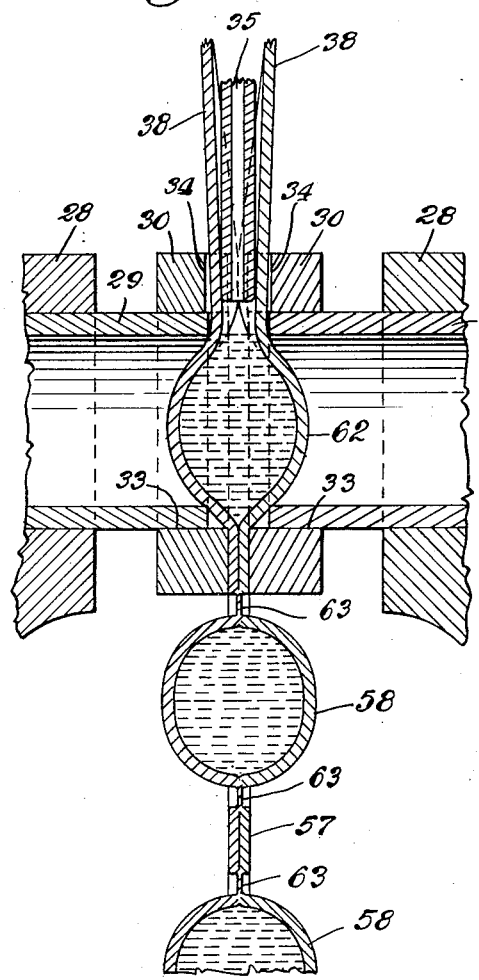
Figure 13 and Figure 14 are sectional views taken on an enlarged scale and illustrating two steps in the capsule formation.

As shown in Figure 3, the parts are separated and a capsule 58 has been completed. The two ribbons 38, 38 have been joined together above the finished capsule 58, as shown in Figure 3. That portion of the ribbons which will form the next capsule to be made is marked 62 in Figure 3. At the next operation of the cams 68 other capsules will be formed. The dies first move to the position of Figure 13 in which the ribbons 38 are forced together to form an initial contact substantially about a capsule space. This contact is broken or interrupted in the periphery of the capsule throughout an area sufficient to permit the member 35 to lie between the stripper plates 30, as shown in Figure 13.

Figure 14:
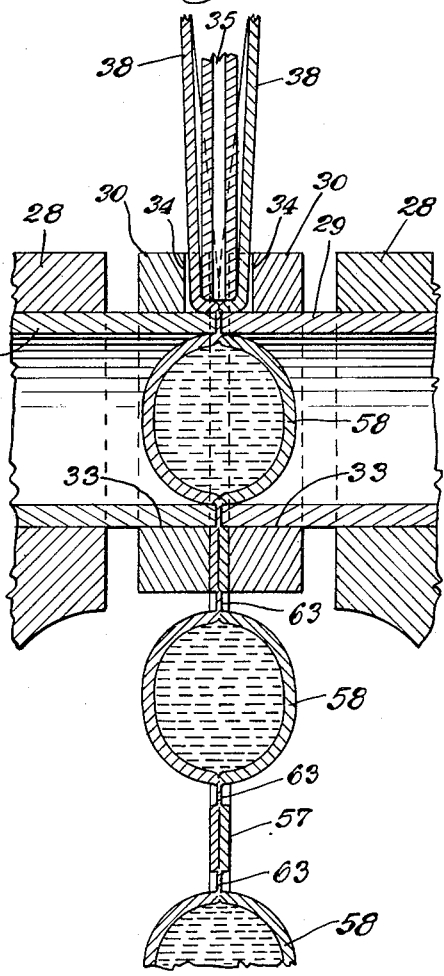

A charge of material is then deposited and the die assemblies are forced together by the cam mechanism. This position is shown in Figure 14. In the position of that figure die inserts 29 have come sufficiently toward each other to complete the capsule about its entire periphery.

Figure 6:
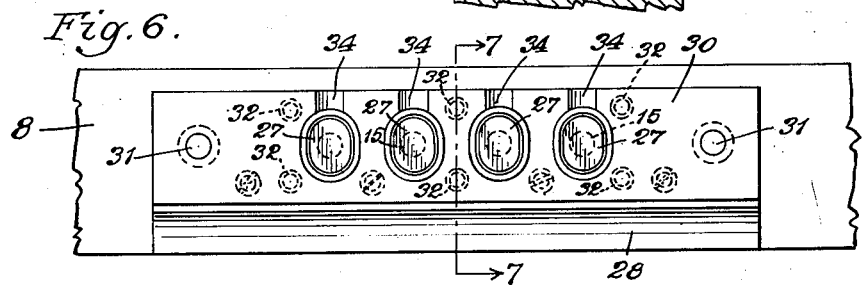
Figure 6 is a front elevation of one of the capsule forming plates.

As pointed out above, the plates 30 are normally positioned forwardly of the leading edges of the dies 29 and thus the plates are the first to contact the ribbons. The plates, since they are either cut away as at 34 or inclined as at 56, enclose the bottom end or a portion of the bottom end of the members 35 or 52, and thus a partially completed capsule is formed which is open sufficiently to permit the means 35 or 52 for supplying the filling material to be in communication with the bag. This condition is illustrated on an enlarged scale in Figure 13. The die members 29 have not yet come into operation but the capsule has been initially formed by the members 30 which, as shown in Figure 6 and Figure 12 in particular, have depressions or cavities of proper shape to give the capsule its initial formation.

When the capsule filling material has been inserted the movement of the die members continues and they reach the position of Figures 4, 11 and 14 in which the die members 29 have moved outwardly beyond the members 30. These members are permitted to yield by their spring supports 32. As the die members move forward they press or compress the ribbon material 38, forming about each capsule a depressed zone or area 63, as shown in Figures 13 and 14. This zone or area is much thinner than the normal thickness of the double ribbon 57 and is weaker. In general, sufficient severance may occur at this point to cause a substantial number of the capsules to fall out of the ribbon 57 as soon as they have passed beyond the dies or die inserts 29. However, sufficient of the area 63 may remain intact to hold the capsules in place within the composite ribbon 57, and the ribbon moves downwardly as indicated in Figure 15, carrying the capsules which remain weakly held in it. When the capsules reach the members 59, they may readily be displaced from the ribbon 57 by the rotating members 59 and fall upon the guides 60 and roll away to a point of use or drying or other treatment.

After a capsule or a series of capsules has been formed, as shown in Figures 4, 11 and 14, the dies move away and the parts return generally to the position of Figure 3. As the parts return to that position, the member 30 is forced forwardly by the springs 32 and thus prevents the ribbon 57 or the lower portions of the ribbons 38 from adhering to the die members 29. As the movement in the reverse direction continues, the knock out members 27, which are mounted upon the plungers 15, contact the capsules 58 and prevent the capsules from sticking either within the die 29 or the plate 30. Means are thus provided for preventing die displacement of the ribbon and also for insuring discharge of the capsule from the die which has made it.

Several times above the expression "a series of capsules" has been used. This expression refers to a number of capsules which are made simultaneously. As shown in the figures herewith, four capsules are made simultaneously; this is, of course, caused by the provision of four inlet members 35 of four passages in the member 52, and the corresponding provision of four depressions or capsule forming cavities in the member 30. If desired, only a single capsule might be formed at a time or a larger number than four might be formed at a time. The expression above quoted refers, therefore, to the capsules which are formed as a group or a series simultaneously. The method is the same, whether one capsule or many are formed at a time.

I claim:

1. In apparatus for forming capsules, a pair of capsule-forming dies mounted for reciprocation forward toward one another and rearward away from one another, each die having a tubular die element projecting forward therefrom, the tubular elements of the two dies being opposed to one another and axially aligned, each die also having a presser plate surrounding its tubular die element and slidable thereon between a forward position wherein its forward face is beyond the end of the tubular die element and a retracted position rearward of said end, spring means for biasing the plates toward their forward positions, a nozzle having its outlet end extending between the presser plates of the two dies, means for feeding a pair of webs of capsule-shell-forming material on opposite sides of the nozzle past its outlet end and between the dies, a single cam reciprocating each of said capsule-forming dies, there being one cam for each die, said cams being formed to move the dies toward one another until the presser plates engage and press the webs together, then to cause the dies to dwell in this position for an interval sufficient for injection of the dose of capsule filling material, then again to move the dies toward one another to move the tubular die elements through the presser plates, the latter remaining stationary in engagement with the webs, whereby as said dies move toward one another first the presser plates engage the webs and tightly press them together over an area surrounding the tubular die elements except for a gap where the outlet end of the nozzle extends between the plates, thereby forming a pocket into which a dose of capsule filling material may be forced through the nozzle, and whereby as the dies continue to move toward one another the tubular elements move through the presser plates to pinch the webs together and form a capsule.

2. In apparatus for forming capsules, a pair of die blocks mounted for reciprocation forward toward one another and rearward away from one another, each block having a set of tubular die elements projecting forward therefrom, respective tubular die elements of the two blocks being opposed to one another and axially aligned, each block also carrying a presser plate having apertures through which its tubular die elements extend, the plate being slidable on the tubular die elements between a forward position wherein its forward face is beyond the ends of the tubular die elements and a retracted position rearward of said ends, spring means for biasing the plates toward their forward positions, a set of nozzles, one for each opposed pair of tubular die elements, having their outlet ends extending between the presser plates and directed toward respective tubular die elements, means for feeding a pair of webs of capsule-shell-forming material on opposite sides of the set of nozzles past their outlet ends and between said die blocks, each one of said die blocks being reciprocated by a single cam formed to move the die blocks toward one another until the presser plates engage and press the webs together over areas surrounding the tubular die elements except for gaps where the outlet ends of the nozzles extend between the plates, thereby forming pockets into which doses of capsule filling material may be injected through the nozzles, said cams being formed then to cause the die blocks to dwell in this poistion for an interval sufficient for injection of the doses of capsule filling material, and then again to move the die blocks toward one another to move the tubular die elements through the apertures in the presser plates, the latter remaining stationary in engagement with the webs, thereby to pinch the webs together and form capsules.

3. Apparatus as set forth in claim 2, further including mechanism for removing formed capsules from the webs comprising a pair of rolls mounted on opposite sides of the webs out of contact with the webs and adapted to engage the capsules formed in the webs, said rolls being driven in the direction of travel of the webs.

4. Apparatus as set forth in claim 2, further including knock-out members mounted for axial movement within the tubular die elements, and mechanism for actuating the knock-out members to drive them out of the tubular die elements as the capsule-forming dies move away from one another.

REX E. MOULE.

REFERENCES CITED

The following references are of record in the file of this patent:

UNITED STATES PATENTS

| Number | Name | Date |
|---|---|---|
| 2,199,210 | Scherer | Apr. 30, 1940 |
| 2,279,505 | Ravenscroft | Apr. 14, 1942 |